(12) United States Patent
Aanerod

(10) Patent No.: US 7,820,049 B2
(45) Date of Patent: Oct. 26, 2010

(54) METHOD FOR MANUFACTURE OF SANITIZED ORGANIC SLUDGE

(75) Inventor: Kjell Aanerod, Sperrebotn (NO)

(73) Assignee: Agronova AS (NO)

( * ) Notice: Subject to any disclaimer, the term of this patent is extended or adjusted under 35 U.S.C. 154(b) by 345 days.

(21) Appl. No.: 12/092,196

(22) PCT Filed: Oct. 31, 2006

(86) PCT No.: PCT/NO2006/000387

§ 371 (c)(1),
(2), (4) Date: Apr. 30, 2008

(87) PCT Pub. No.: WO2007/053033

PCT Pub. Date: May 10, 2007

(65) Prior Publication Data

US 2008/0280347 A1    Nov. 13, 2008

(30) Foreign Application Priority Data

Oct. 31, 2005    (NO) .................................. 20055066

(51) Int. Cl.
*C02F 3/00* (2006.01)
(52) U.S. Cl. ..................................................... 210/623
(58) Field of Classification Search .................. 210/623
See application file for complete search history.

(56) References Cited

U.S. PATENT DOCUMENTS 4,559,143 A    12/1985    Asada et al.
4,659,472 A    4/1987    Nordlund et al.

FOREIGN PATENT DOCUMENTS

| | | |
|---|---|---|
| CH | 627718 A5 | 1/1982 |
| DE | 4404895 C1 | 8/1995 |
| DE | 19922872 A1 | 3/2001 |
| EP | 0072214 A1 | 2/1983 |
| FR | 2814461 A1 | 3/2002 |
| JP | 57081893 A | 5/1982 |
| JP | 58190887 A | 11/1983 |
| JP | 59078098 A | 5/1984 |
| JP | 60065784 A | 4/1985 |
| JP | 60197299 A | 10/1985 |
| JP | 8208362 A | 8/1996 |
| JP | 2005095737 A | 4/2005 |
| WO | 9710190 A1 | 3/1997 |

*Primary Examiner*—Chester T Barry
(74) *Attorney, Agent, or Firm*—Brooks Kushman P.C.

(57) ABSTRACT

It is described a method for manufacture of sanitised organic sludge, said method comprising the following steps: mechanical mixing of a cellulose containing component, a super absorbent and dewatered organic sludge; leading the mixture to a sanitising container; continuously supplying air to the sludge mixture until the desired temperature has been reached. The super absorbent increases the moisture retention of the sludge mixture, such that odor and leakage is prevented during composting. The cellulose component, preferably shredded newspaper, admits increased air supply to the sludge mixture. The method may be used to treat sewage sludge, hydrocarbon polluted soil and waste from fish processing or abattoirs.

4 Claims, No Drawings

METHOD FOR MANUFACTURE OF SANITIZED ORGANIC SLUDGE

The present invention relates to a method for sanitation of organic sludge.

Depositing organic sludge, in particular dewatered sludge, from public sewage treatment plants constitutes a large environmental problem, particularly with regard to odours, danger of infection, drainage, etc. To be able to make use of such sludge, it must be sanitised so that the treated sludge can, for example, be used as a fertiliser or a soil improvement agent. Sanitation takes place in that the temperature of the mass is brought up to about 60° C., something that reduces the bacterial activity in the sludge, and thus the danger of infection, to an acceptable level.

One problem that arises in the sanitation in particular of sludge from sewage treatment plants, is that the consistency of the sludge makes it difficult to achieve sufficiently good sanitation with the help of composting. Normally, the sludge consists of very fine particulate matter, something that leads to the aerobic bacteria that carry out the degradation process itself not being supplied sufficient oxygen for the process to run satisfactorily. In addition to the sludge consisting of very fine particles, further formation of moisture will also take place, something that leads to the supply of oxygen being further reduced. This could result in problems with smells and drainage of fluid.

A series of methods and equipment for treatment of such sludge is known. The previously most used method is composting of the sludge. This is a very time consuming process that leads to problems with regard to smell, drainage and which in addition results in a matter that is difficult to handle.

Another known method is adding lime to the mass, something that leads to a chemical reaction with an associated increase in the mass temperature. A disadvantage with this method is that relatively large amounts of lime are required, something that can lead to odour problems (formation of ammonia), and which also can kill some of the bacteria that are appropriate if the treated sludge is to be used as a fertilizer or a soil improvement agent.

Yet another known method is heat treatment and/or drying of the sludge by supplying heat from an external heat source. This is an energy demanding and costly process.

From the patent literature several different solutions to treat sludge containing organic matter are known.

From DD 14265 a method to treat drilling muds is known where fly ash, a coagulation agent, for example lime, and a flocculating agent, for example polyacrylamide are added. In addition, a binding agent, for example consisting of cement and potassium silicate, is added.

From DE 199 22 872, a method for manufacture of artificial soil is known. The product consists of sludge, paper, lime, waste materials from fruit and vegetables, nitrate and charcoal. The publication does not describe addition of a super absorbent to the sludge.

From WO 97/10190 a method is known for treatment of organic waste, for example, sewage water. Firstly, shredded paper or cardboard are added to the waste. Thereafter, earthworms are allowed to digest the mixture of waste and paper. An alkali, for example lime, is then added to raise the pH of the mixture. This publication does not mentioned addition of a super absorbent to the sludge either.

From U.S. Pat. No. 4,659,472 a method for manufacture of a mixture of sludge that can be composted from a sewage treatment plant is known. Wet sludge with a dry matter content of about 3% by weight is fed to a mixing tank and sawdust is added during stirring with the help of air. After the mixing tank, this suspension is pumped further with a polyelectrolyte solution being added before it is fed to a filter for removal of water, and the resulting mixture has a dry solids content of about 30% by weight. This dewatered mixture is then subjected to a composting process. The most important differences between the methods according to this publication and the invention are that treatment of a wet (liquid) sludge with a dry matter content of about 3% by weight is described, but the invention has as an aim to treat already dewatered sludge from a sewage treatment plant with a dry matter content of 20-25% by weight (claim 4). This difference in dry matter content leads to the further treatment of the sludge being very different. According to the invention, the cellulose fibres are firstly mixed with the super absorbent. The aim of this is, according to the invention, to get a better distribution of the super absorbent in the resulting mixture than if the super absorbent is added directly to the sludge or after the sludge and cellulose fibres have been mixed. U.S. Pat. No. 4,659,472 further describes that the sludge mixture is pressed to a dry matter content of about 30% by weight, this means that the mass that comes out from the process in U.S. Pat. No. 4,659,472 has only fractionally higher dry matter content than the mass that is fed into the process according to the invention. As the dry matter content of the wet sludge that is supplied to the process according to U.S. Pat. No. 4,659,472 has only a dry matter content of 3% by weight, against 20-25% by weight according to the invention, this means that at corresponding volumes of the process tanks, the method according to the invention is capable of treating 7-8 times more sludge volumes than the method according to U.S. Pat. No. 4,659,472.

From JP 60197299 a method is known for manufacture of a combustible dehydration promoting agent, where an organic fibrous substance and a cationic, high molecular substance are mixed and pressed under high pressure to a density of 0.3 g/cm$^3$ or more. This dehydration-promoting agent is thereafter added to a sludge, which is finally pressed. This publication does not describe a method for production of a sludge mixture from a sewage treatment plant that can be composted, and the abstract indicates that the sludge mixture is to be burnt. The aim of adding dehydration promoting means produced by the fibrous organic substance and the cationic substance is to be able to remove water from the mixture in a later processing step. This publication does not describe a method for the manufacture of a mixture of a fibre containing substance, a super absorbent and dewatered organic sludge, according to the present invention, that can be composted either.

From JP 59078098 a method is known to remove the water content of a dehydrated sludge cake by adding a mixture of a fibrous substance and a cationic coagulant and thereafter vacuuming dry this mixture. This publication does not describe a method for manufacture of a mixture of organic sludge, a fibrous substance and a super absorbent that can be composted either, as described in the present application.

From U.S. Pat. No. 4,559,143 a method is known for sludge treatment where fibre, for example, organic fibres, and a coagulant are added to the sludge. The aim of the addition of these materials is to increase the formation of so-called flocs to improve the filtration characteristics of the sludge, thereby making it easier to obtain dewatered sludge. This method is directed toward treatment of non-dewatered sludge to make it easier to remove the water content. The sludge according to the present invention has already been dewatered and the aim of the method according to the invention is thus another. This is further supported by the examples in U.S. Pat. No. 4,559,143 where a non-dewatered sludge with a dry matter content of 3.5% by weight is used in example 1.

From CH 627 718 a method is known for sanitation of sludge with a dry matter content of at least 4% by weight. The sludge is fed to an air container and oxygen containing gas or pure oxygen is added during agitation. The sludge is thereafter fed to a degradation container where methane gas is formed. This publication is not considered relevant for the present application either, as dewatered sludge is not used, there is no addition of fibres and no absorbent either.

The present invention has as an aim to provide a method for treatment of organic sludge, which is not encumbered with the disadvantages of the known methods described above, and where the treated sludge can be used as a fertiliser or a soil improvement agent without any further treatment.

A further aim is to provide a method that does not require supply of energy to achieve sufficient sanitation of the sludge, at the same time as problems with drainage and odours are avoided.

These and other aims are obtained with a method for manufacture of sanitised organic sludge which is characterised in that the method incorporates the following steps.

mechanical mixing of a part containing cellulose fibres with a super absorbent and dewatered organic sludge, said dewatered organic sludge having a dry matter content of 20-25% by weight, and the amount of cellulose fibres in relation to dewatered organic sludge is 5-10% by weight.

feeding the sludge mixture containing super absorbent and cellulose fibres to a sanitation container continuously feed air to the sludge mixture until the desired temperature has been reached.

The cellulose fibre containing part is preferably mixed with the super absorbent before addition of dewatered organic sludge.

The cellulose fibre containing component is preferably shredded newspaper and the super absorbent is a biologically degradable polyacrylamide.

The organic sludge is/can be hydrocarbon polluted soil and/or waste from fish processing/abattoirs.

The method according to the invention will be described in more detail in the following with the help of an embodiment example.

According to the method according to the invention, organic sludge, preferably dewatered organic sludge from a sewage treatment plant, is mixed with cellulose fibres and a super absorbent. The super absorbent is, for example, polyacrylamide or another biological degradable super absorbent. A person skilled in the arts will easily be able to find an appropriate super absorbent from the relevant criteria. The cellulose fibres are preferably shredded strips of newspaper or the like. The amount of super absorbent in relation to newspaper is of the order 2% by weight. The amount of newspaper in relation to dewatered organic sludge is of the order 5-10% by weight. After mixing of the ingredients, the resulting sludge mixture is subjected to composting with air added until the resulting sanitation temperature has been reached. The required sanitation temperature is around 58-60° C. This composting takes place without any supply of external energy.

With regard to an especially preferred embodiment of the method according to the invention, the cellulose fibres are first mechanically mixed with the super absorbent. The dewatered organic sludge, having a dry matter content of around 20-25% by weight, is thereafter mechanically mixed into the mixture of cellulose fibres and super absorbent. The aim of first mixing the cellulose fibres and the super absorbent before the organic sludge is added to the mixture is that one achieves a better distribution of the super absorbent in the final mixture.

After sludge, cellulose fibres and super absorbent have been mixed, a porous mixture has been produced which can be composted, for example, in a container with a supply of air, such that the desired sanitation temperature is reached. As soon as the mass is sanitised, it can be applied as a fertilizer or a soil improvement agent. Tests have shown that by using the method according to the invention, the sanitation time can be reduced from around 3 years for organic sludge with no addition of cellulose fibres and heat to about 3 days.

The method according to the invention is particularly suited to treatment of dewatered sewage sludge from sewage treatment plants, but it is also implied that the method can be used in the treatment of other organic sludge, for example soil contaminated with hydrocarbon containing compounds, typically oil, wastes from abattoirs/fish processing and the like.

The invention claimed is:

1. Method for manufacture of sanitized organic sludge, characterized in that the method comprises the following steps:

mechanical mixing of shredded newspaper with a super absorbent and dewatered organic sludge, said dewatered organic sludge has a dry matter content of 20-25% by weight, and the amount of shredded newspaper in relation to the dewatered organic sludge is 5-10% by weight, compositing the sludge mixture containing super absorbent and shredded newspaper in a sanitizing container, continuously supplying air to the sludge mixture until a desired temperature has been reached.

2. Method according to claim 1, characterized in that the shredded newspaper is mixed with the super absorbent before addition of the dewatered organic sludge.

3. Method according to claim 1, characterized in that the super absorbent is a biologically degradable polyacrylamide.

4. Method according to claim 1, characterized in that the organic sludge is hydrocarbon-polluted soil and/or waste from fish processing/abattoirs.

* * * * *